United States Patent [19]
Zimmerer et al.

[11] 3,738,687
[45] June 12, 1973

[54] FLEXIBLE JOINTS FOR AN OVERHEAD IRRIGATION SYSTEM

[76] Inventors: Arthur L. Zimmerer; Bernard J. Zimmerer; Paul B. Zimmerer, all of Lindsay, Nebr.

[22] Filed: Nov. 23, 1970

[21] Appl. No.: 92,089

[52] U.S. Cl. ............... 285/5, 285/93, 285/373, 137/344, 239/212
[51] Int. Cl. ............................................. F16l 55/00
[58] Field of Search ............... 285/93, 5, 265, 373, 285/118, 110, 111; 137/344; 239/212, 213, 177

[56] References Cited
UNITED STATES PATENTS

| | | | |
|---|---|---|---|
| 2,494,854 | 1/1950 | Anderson | 285/5 |
| 3,057,559 | 10/1962 | Ingram et al. | 239/213 |
| 3,533,557 | 10/1970 | Ingram et al. | 239/212 |
| 2,889,993 | 6/1959 | Willetts et al. | 239/213 X |
| 3,394,729 | 7/1968 | Bower et al. | 137/344 |
| 2,800,364 | 7/1957 | Dick et al. | 239/212 X |
| 2,672,356 | 3/1954 | Crockett | 285/5 |
| 2,985,435 | 5/1961 | Gross | 285/373 X |

Primary Examiner—Andrew V. Kundrat
Attorney—Zarley, McKee & Thomte

[57] ABSTRACT

The adjacent extremities of two similar lengths of irrigation pipe are axially aligned in spaced relation within a longitudinally-split bolt-closed coupler sleeve, of larger diameter than the pipes, containing a sealing gasket for each pipe extremity which resiliently seal the extremities within the sleeve. An open gimbal ring medially surrounds the coupler sleeve in diametrically-spaced relation therewith. Bracket members are mounted on the opposite sides of each pipe extremity in longitudinally spaced relation to the coupler sleeve and a pair of arms extend from each bracket member to opposite pivotal connections with the gimbal ring, the axes of the pivotal connections on one pair being circumferentially spaced on said gimbal ring at 90° from the pivotal connections of the other pair to enable the pipe lengths to freely, relatively and arcuately swing in any desired direction. A signal device is trained between the extremities of the pipe lengths to give a signal relative to the arc of swing between said extremities.

13 Claims, 5 Drawing Figures

PATENTED JUN 12 1973

INVENTORS
ARTHUR L. ZIMMERER
BERNARD J. ZIMMERER
PAUL B. ZIMMERER
by R.H.Galbreath ATTORNEY

FLEXIBLE JOINTS FOR AN OVERHEAD IRRIGATION SYSTEM

While not limited to, this invention is especially useful in an overhead irrigation system for the type having a line of sprinkler-carrying pipe lengths supported above the ground upon spaced, portable, self-propelled, individually motor driven, supporting towers, the pipe-line being pivotally mounted at one extremity so that the towers travel in circles around the pivoted extremity to irrigate a relatively large circular area such as shown in prior U.S. Pat. Nos. 3,335,958 and 3,394,729.

Since the large area being irrigated is rarely flat, the towers will be constantly travelling over a plurality of differing grades. Often one tower will be at a higher altitude than the adjacent towers at each side, therefore the plurality of pipe lengths must be joined by universally-flexible joints to prevent damage to the pipe-line.

Attempts have been made to join such lengths with flexible hydraulic couplings, such as sections of flexible hose or corrugated sleeves such as shown in prior U.S. Pat. Nos. 2,889,993 and 3,053,554, but these attempts have not been satisfactory since the constant flexing quickly destroys the connection and frequent and expensive replacements are often necessary. Other attempts have been made to provide the adjoining extremities with large ball and socket elements, such as shown in prior U.S. Pat. No. 1,617,587 and No. 2,628,863, but these have been too heavy and too costly to be practical and were subject to damage occasioned by the constant relative axial and angular movements of the connected lengths.

Many of the prior devices for this purpose allow the lengths to axially rotate relative to each other which results in constant damage, such as twisting and breaking the the hoses, couplings and connecting links, and also makes it difficult to install safety signals at the joints.

This invention relates specifically to a flexible joint structure for overhead irrigation pipes and has for its principle object the provision of a flexible joint which will overcome the above difficulties and which: will be economical to manufacture and highly efficient in use; will allow replacements to be quickly and easily made without disturbing the pipe-line or its supporting towers; which will freely and accurately maintain the required universal angular movements of the pipe-line without strain or leakage; and which will absolutely prevent relative axial rotation between the adjacent pipe lengths in the pipe line.

A further object is to provide flexible joints of the above type with means for supporting and actuating electrical switching devices, which will automatically control the operation of the drive motors on the supporting towers, in consequence of relative angular movements in a horizontal plane between adjacent pipe lengths in the pipe line.

Other objects and advantages reside in the detail construction of the invention, which is designed for simplicity, economy and efficiency. These will become more apparent from the following description.

In the following detailed description of the invention, reference is made to the accompanying drawings which form a part hereof. Like numerals refer to like parts in all views of the drawings and throughout the description.

Figure 5:
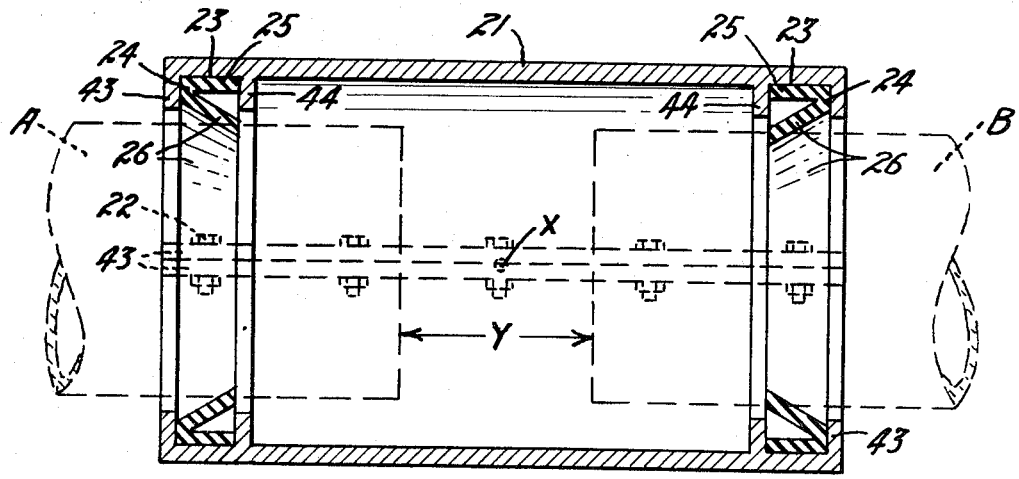

FIG. 5 is an enlarged longitudinal, axial, detail section through a coupling sleeve employed in the invention which will be later described. The coupling sleeve is shown in solid line as it would appear removed from the pipes A and B. The final position of the pipes when assembled in the sleeve is indicated in broken line.

Two elongated, bracket members 10 and 11 of V-shaped cross section are welded or otherwise secured to the pipe A adjacent and upon opposite sides of, its joining extremity and two similar bracket members 12 and 13 are similarly positioned and secured to the pipe B adjacent its joining extremity. A first pair of elongated pivot arms 14 and 15 are welded or otherwise respectively secured upon the bracket members 10 and 11 and extend longitudinally beyond the joining extremity of the pipe A. A second pair of similar elongated pivot arms 16 and 17 are similarly and respectively secured to the bracket members 12 and 13 and extend longitudinally beyond the extremity of the pipe B intermediate the first pair of arms 14 and 15.

The extremities of the first pair of arms 14 and 15 are pivoted (at 180° spacing) by means of pivot bolts 18 to opposite vertical, flat sides of an open, octagonal gimbal ring 19 which surrounds the adjacent extremities of the pipes in radially-spaced relation therewith. The extremities of the second pair of arms 16 and 17 are similarly pivoted to intermediate horizontal flat sides of the gimbal ring 19 by means of pivot bolts 20, spaced at 90° from the pivot bolts 18.

The pivot bolts 18 and 20 lie in a common plane and the latter plane intersects tne intersection of the center lines of the pipes A and B within the gimbal ring 19, as indicated by the point X in FIG. 5. In actual practice, the length of the arms 14, 15, 16 and 17 is such as to maintain the pipe extremities spaced from each other, as indicated at Y in FIG. 5. This provides a universal angular connection between the two pipes and prevents relative axial rotation therebetween.

A split-cylindrical coupling sleeve 21, consisting of two semi-cylindrical halves, of greater internal radius than the external radius of the pipes, concentrically surrounds the open spaced-extremities of the two pipes within the gimbal ring 19. The halves are provided with radially-extending edge flanges 43 which are clamped together by means of suitable clamp bolts 22. The halves of the coupling sleeve 21 are provided at their extremities, with pairs of inwardly projecting annular ridges 44 which form terminal gasket grooves 23 to receive annular, pre-formed sealing gaskets 24. The gaskets 24 are V-shaped in axial cross section to form an annular external flap 25, which fits within the gasket groove 23, and a resilient inclined annular internal flap 26 which is constantly urged into circumferential sealing engagement with the exterior of the pipes by their inherent resiliency and by the pressure of the water within the coupling. Suitable elongated resilient sealer strips 27 are preferably placed between the contacting surfaces of the halves of the coupling sleeve 21 to resist radial leakage. It will be noted, that the coupling sleeve 21 can be quickly and easily disassembled and reassembled for gasket removal and replacement without disturbing the pipe-line or its supporting towers.

It can be seen that as thus far described an efficient flexible pipe joint is provided for any desired use since the spaced pipes can be freely and relatively swung in any desired direction and at any desired angle without intermediate leakage. The joint can be supported in any desired manner. As herein illustrated, the pipe A is supported by the pipe B and suitable brackets 42 are provided on the pipe B for connecting conventional supporting towers thereto.

To increase the desirability for overhead sprinkler use, a signal device is incorporated with the above flexible joint should it be desired to automatically control the pipe angularity, the water supply and the pipe-line alignment in long overhead pipe systems.

As illustrated, the signal device employes an electrical control box 28, containing desired electrical switching elements, to which current is supplied from the pivoted extremity of the pipe-line through a supply cable 29 and from which current is supplied to a supporting tower motor by means of a motor cable 30. The switching elements are controlled by reciprocation of an external toggle switch lever 31 which is mounted for reciprocation on the control box 28. This invention is more particularly directed to the means for actuating the switch lever 31 in consequence of variations in angle between the pipes A and B. The elements in the control box 28 are within the skill of one skilled in the art desiring to attain the desired results. For instance, typical box circuits and typical individual tower motors are shown in prior U.S. Pat. No. 3,394,729.

In the present instance, the box 28 is supported from one side of the pipe B upon a horizontally extending bracket arm 32, which for convenience of assembly is formed in two parts joined by means of suitable clamp bolts 33. A horizontal control arm 34, braced by a triangular gusset plate 41, is welded or otherwise secured to the pivot arm 15 of the pipe A so as to project sidewardly therefrom. The outer extremity of the control arm 34 is turned at right angles, as shown at 35, to support a conventional ball-and-socket fitting 36 which rotatably and tiltably supports a rod head 37. The switch lever 31 is actuated by means of a threaded connecting rod 38, connected therewith as shown at 39, and extending through the rod head 37, as shown in FIG. 1, where it can be locked at any desired longitudinal position by means of a pair of lock nuts 40.

Figure 1:
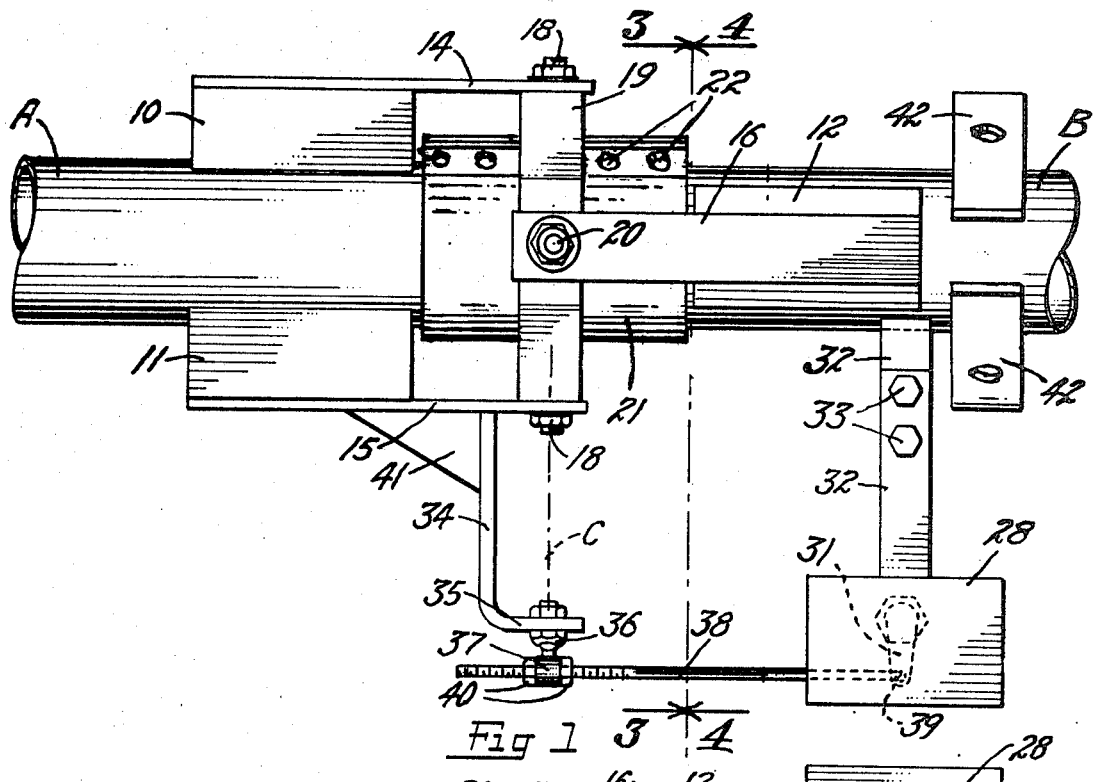
FIG. 1 is a top plan view of the flexible joint of this invention as it would appear joining the extremities of two conventional overhead irrigation pipes "A" and "B" flexibly together.
Figure 2:
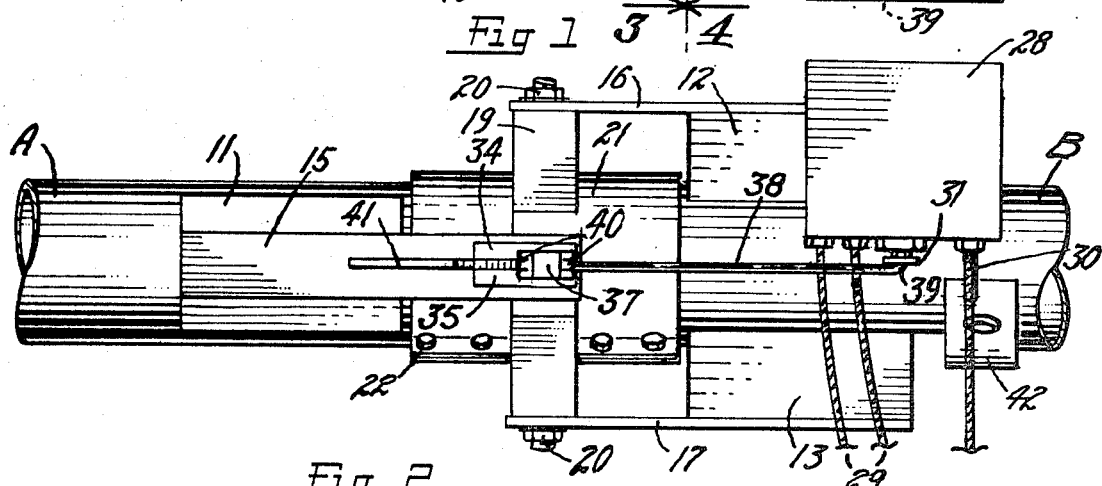
FIG. 2 is a side elevational view of the joint of FIG. 1.
Figure 3:
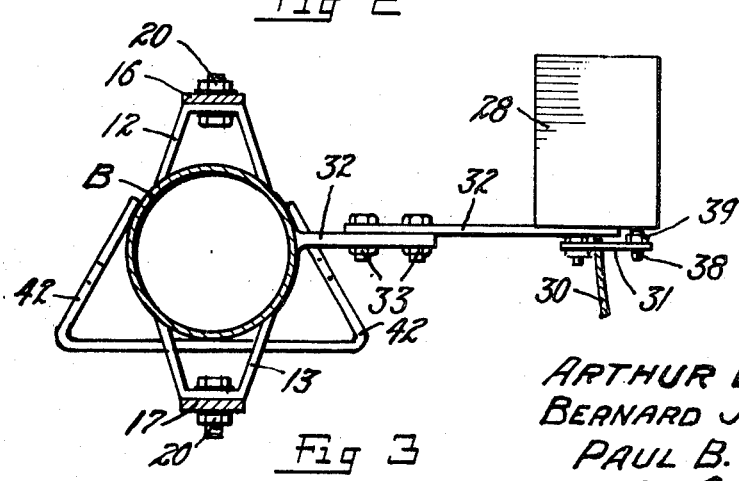
FIG. 3 is a cross sectional view taken on the line 3—3, FIG. 1.
Figure 4:
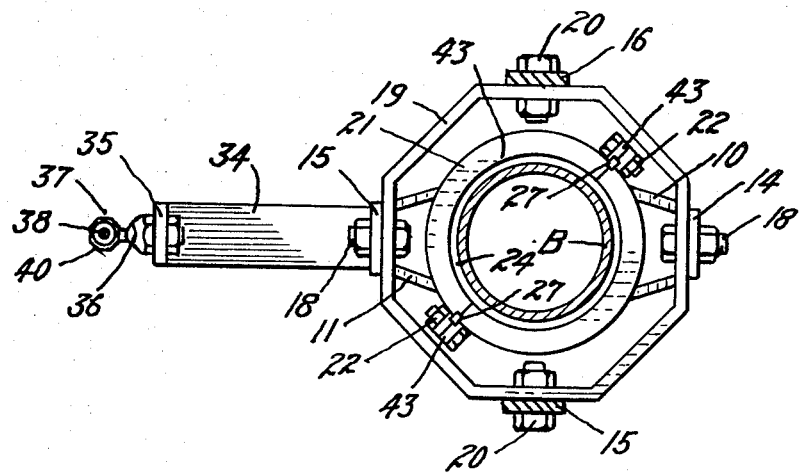
FIG. 4 is a cross sectional view taken on the line 4—4, FIG. 1.

The ball-and-socket fitting 36 is axially aligned with the axes of the pivot bolts 18 of the gimbal ring 19, as indicated by the center line C in FIG. 1, and the connecting rod 38 is axially parallel to the axis of the pipe B so that all relative sidewise, angular movements of the connected lengths will cause the connecting rod 38 to swing the switch lever 31 back and forth on the control box to control the circuits therein in correspondence with the said sidewise angular movements. The lock nuts 40 allow presetting adjustments to be conveniently made along the rod 38 so as to accomplish the desired results.

Thus, in a sprinkling system of the type having motor propelled supporting towers, the motors in the individual towers will be automatically controlled by the horizontal angles assumed at their respective flexible joints so as to automatically maintain the entire pipe-line in substantial alignment. It will be noted that the assumed angles of the pipe will be multiplied by the length of sideward extension of the bracket arm 32 and the control arm 34 so that a multiplied actuation will be obtained at the switch lever 31 to facilitate accurate control.

While a selected form of the invention has been above described, it is understood that mechanical variations and detail substitutions can be made by one skilled in the art without departing from the spirit of the invention.

Having thus described the invention what is claimed and desired to be secured by Letters Patent is:

1. A pipe joint, for flexibly joining an extremity of a first pipe to an extremity of a second pipe positioned in axial alignment with and spaced from the first pipe, comprising:
   a. a rigid generally cylindrical split coupler sleeve surrounding the adjacent extremities of both pipes;
   b. means for flexibly sealing said extremities to said sleeve;
   c. a pair of radially-projecting bracket members secured to opposite sides of each pipe in axially-spaced relation to the coupler sleeve thereon;
   d. an open gimbal ring medially and concentrically surrounding said coupler sleeve in radially-spaced relation with the latter;
   e. a pair of similar, elongated, substantially-parallel pivot arms affixed at their one extremities to each bracket member and extending to a pivotal connection with said gimbal ring at their other extremities, the pivotal connections of each pair being circumferentially-spaced on said gimbal ring at 90° from and intermediate the pivotal connections of the other pair so that pipes may assume universal angular relations with each other.

2. A pipe joint, for flexibly joining an extremity of a second pipe position in axial alignment with and spaced from the first pipe, comprising:
   a. a generally cylindrical coupler sleeve surrounding the adjacent extremities of both pipes;
   b. means for flexibly sealing said extremities to said sleeve;
   c. a pair of radially-projecting bracket members secured to opposite sides of each pipe in axially-spaced relation to the coupler sleeve thereon;
   d. an open gimbal ring medially and concentrically surrounding said coupler sleeve in radially-spaced relation with the latter;
   e. a first pair of similar, elongated, substantially parallel pivot arms affixed at their one extremities to the bracket members of the first pipe and extending to a pivotal connection with said gimbal ring at their other extremities;
   f. a second similar pair of elongated parallel pivot arms affixed at their one extremities to the bracket members of the second pipe and extending to a pivotal connection with said gimbal ring at their other extremities intermediate the pivotal connections of the first pair;
   g. a control arm secured to and extending laterally outward from one of the first pair of pivot arms;
   h. a bracket arm secured to and extending laterally outward from the second pipe substantially in the plane of and parallel to said control arm;

i. a control box, provided with a switch lever, supported by said bracket arm; and j. a connecting rod pivotally connected between said control arm and said switch lever for actuating the latter in consequence of varying angular relations between said pipes.

3. A pipe joint as described in claim 2 in which:

a. the axis of the pivotal connection between said control arm and said connecting rod is in lateral axial alignment with the pivotal connections of the first pair of pivot arms with said gimbal ring.

4. A pipe joint as described in claim 3 having:

a. means for pre-adjusting and presetting the operational length of said connecting rod.

5. A pipe joint as described in claim 3 in which:

a. the longitudinal axis of said connecting rod is parallel to the combined axes of said pipes when the latter are axially aligned.

6. A pipe joint as described in claim 5 in which:

a. the gimbal ring is octagonal so as to provide four rectangularly positioned flat sides to facilitate the positioning of the pivotal connections of the four pivot arms therewith;

7. A pipe joint as described in claim 6 in which the coupler sleeve comprises:

a. two semi-cylindrical halves of greater radius than the external radius of said pipes provided with an internal annular gasket groove adjacent each extremity.

b. clamp bolts joining the two halves in annular relation about said pipes; and c. an annular gasket of V-shaped axial cross section positioned in each gasket groove and being radially compressed against said pipe.

8. A pipe joint, for flexibly joining an extremity of a first pipe to an extremity of a second pipe positioned in axial alignment with and spaced from the first pipe, comprising:

a. a rigid generally cylindrical split coupler sleeve surrounding the adjacent extremities of both pipes;

b. means for flexibly sealing said extremities to said sleeve;

c. a first and second support means secured at opposite sides of and adjacent the extremity of said first pipe;

d. a third and fourth support means secured at opposite sides of and adjacent the extremity of said second pipe;

e. a support member extending around said coupler sleeve in radially-spaced relation with the latter; and f. elongated pivot arms respectively secured at one end to said first, second, third and fourth support means and being respectively pivotally connected at their other ends to said support member, the pivotal connections being alternately and circumferentially spaced on said support member at 90° from each other.

9. A pipe joint as described in claim 8 having:

a. control means interconnected between the two pipes to provide an electrical signal in consequence of only relative sidewise angular movements of said pipes.

10. A pipe joint, for flexibly joining an extremity of a first pipe to an extremity of a second pipe positioned in axial alignment with and spaced from the first pipe, comprising:

a. a rigid generally cylindrical split coupler sleeve surrounding the adjacent extremities of both pipes;

b. means for flexibly sealing said extremities to said sleeve;

c. a pair of radially-projecting bracket members secured to opposite sides of each pipe in axially-spaced relation to the coupler sleeve thereon;

d. an open gimbal ring medially and concentrically surrounding said coupler sleeve in radially-spaced relation with the latter;

e. a pair of similar, elongated, substantially-parallel pivot arms affixed at their one extremities to each bracket member and extending to a pivotal connection with said gimbal ring at their other extremities, the pivotal connections of each pair being circumferentially-spaced on said gimbal ring at 90° from and intermediate the pivotal connections of the other pair so that pipes may assume universal angular relations with each other;

f. said coupler sleeve comprising two semi-cylindrical halves of greater internal radius than the pipes removably assembled to form a complete cylinder; an internally-indented gasket groove formed adjacent each extremity of each half, the grooves of each half being in circumferential alignment with the grooves in the other half; and annular gaskets embedded in the aligned grooves of the halves to externally seal said pipes to said assembled cylinder.

11. A pipe joint, for flexibly joining an extremity of a first pipe to an extremity of a second pipe positioned in axial alignment with and spaced from the first pipe, comprising:

a. a rigid generally cylindrical split coupler sleeve surrounding the adjacent extremities of both pipes;

b. means for flexibly sealing said extremities to said sleeve;

c. a pair of radially-projecting bracket members secured to opposite sides of each pipe in axially-spaced relation to the coupler sleeve thereon;

d. an open gimbal ring medially and concentrically surrounding said coupler sleeve in radially-spaced relation with the latter;

e. a pair of similar, elongated, substantially-parallel pivot arms affixed at their one extremities to each bracket member and extending to a pivotal connection with said gimbal ring at their other extremities, the pivotal connections of each pair being circumferentially-spaced on said gimbal ring at 90° from and intermediate the pivotal connections of the other pair so that pipes may assume universal angular relations with each other;

f. control means interconnected between the two pipes to provide an electrical signal in consequence of the angular relations assumed by the pipes;

g. said control means comprising a control arm fixedly supported from the first pipe and projecting laterally outward therefrom; a bracket arm fixedly supported from the second pipe and projecting laterally outward therefrom in substantially parallel relation to said control arm; a control box, containing electrical signal means, supported by said bracket arm; a circuit control switch adapted to control said signal means mounted on and supported by said box; and a connecting rod extending from said control arm so that relative angular movements between said pipes will actuate said